United States Patent [19]

House

[11] 4,162,242
[45] Jul. 24, 1979

[54] POLYOL STABILIZATION ADDITIVE FOR POLYPYRROLIDONE

[75] Inventor: Ralph House, El Sobrante, Calif.

[73] Assignee: Chevron Research Company, San Francisco, Calif.

[21] Appl. No.: 908,889

[22] Filed: May 24, 1978

Related U.S. Application Data

[63] Continuation of Ser. No. 781,597, Mar. 28, 1977, abandoned.

[51] Int. Cl.$^2$ ............................................. C08K 5/05
[52] U.S. Cl. .................... 260/30.8 R; 260/33.4 R; 528/326
[58] Field of Search .......... 260/78 P, 30.8 R, 33.4 R; 528/328

[56] References Cited

U.S. PATENT DOCUMENTS

| 3,009,893 | 11/1961 | Barnes et al. | 260/33.4 R |
| 3,017,393 | 1/1962 | Ney et al. | 260/78 P |
| 3,052,654 | 9/1962 | Roth et al. | 260/78 P |
| 3,072,615 | 1/1963 | Riedesel | 260/78 P |
| 3,721,652 | 3/1973 | Barnes | 260/78 P |
| 3,763,077 | 10/1973 | Eusebi et al. | 260/33.4 R |
| 3,923,925 | 12/1975 | Schneider et al. | 260/78 P |
| 3,968,087 | 7/1976 | Choi | 260/78 P |
| 4,017,465 | 4/1977 | Bacskai | 260/78 P |

OTHER PUBLICATIONS

JA-7211671-R Derwent Abstract, "Polyamide Comp. Stabilized Against Light & Heat with Saccharide & Mn Salt".

*Primary Examiner*—Herbert J. Lilling
*Attorney, Agent, or Firm*—Dix A. Newell; T. G. DeJonghe; Lawrence S. Squires

[57] ABSTRACT

Certain polyhydric alcohols are thermal stabilization additives for normally solid polypyrrolidone at melt temperatures.

11 Claims, No Drawings

POLYOL STABILIZATION ADDITIVE FOR POLYPYRROLIDONE

This is a continuation of application Ser. No. 781,597 filed Mar. 28, 1977, and now abandoned.

BACKGROUND OF THE INVENTION

Poly-2-pyrrolidone is the source of a useful synthetic fiber for the textile industry. The melt-spinnable white solid polymer is produced by the alkaline-catalyzed polymerization of 2-pyrrolidone in the presence of carbon dioxide (see U.S. Pat. No. 3,721,652). Polypyrrolidone so-produced is melt-spun into filaments by extrusion from multi-hole spinnerets. In meltspinning, the polymer composition is extruded in a molten condition at a melt temperature which is generally greater than about 270° C. The extrusion must be carried out with care because of the tendency of polymer to thermally degrade and revert to monomer. Degradation produces an unacceptable extrudate containing foam or bubbles. If extrusion is attempted at an appreciably lower temperature to avoid thermal decomposition, fibers of lower tensile strength are produced. Consequently, in order to melt extrude polypyrrolidone efficiently, one may either seek to increase the thermal stability of the polymer, or to improve the extrudability of the polymeric composition. U.S. Pat. No. 3,009,893 teaches the use of substantial amounts (up to 30 weight percent) of certain monohydric alcohols, polyols, amides, etc. in polypyrrolidone compositions as melting point depressants. These materials have certain solubility parameters and are admixed with polypyrrolidone in amounts which cause substantial decrease in the melting point of the composition in comparison with pure polypyrrolidone in order to provide a convenient means of extruding or casting polypyrrolidone without appreciable thermal decomposition. The melting point of the high-molecular-weight solid polypyrrolidone finding use within the scope of the present invention is about 264° C. or higher. The materials used in U.S. Pat. No. 3,009,893 are admixed with polypyrrolidone in sufficient amounts to depress the melting point of polypyrrolidone below 260° C. to 200° C. or lower (see Column 4, line 27 et seq. of U.S. Pat. No. 3,009,893).

SUMMARY OF THE INVENTION

The thermal stability of poly-2-pyrrolidone at melt temperature is appreciably improved by the addition of certain polyhydric alcohols. The poly-2-pyrrolidone composition comprises a major amount of normally solid poly-2-pyrrolidone and less than about 5 weight percent of a polyhydric alcohol having a boiling point of about 200°-300° C. or greater. An improved method of melt extrusion utilizes said composition to provide for the continuous extrusion of poly-2-pyrrolidone at extrusion melt temperatures in the range of about 260°-280° C.

DESCRIPTION OF PREFERRED EMBODIMENTS

A useful synthetic fiber is produced by the melt extrusion at melt temperatures in the range of about 260°-280° C., preferably 260°-275° C., and most preferably 260°-270° C., of a composition comprising a major amount of polypyrrolidone and less than about 5 weight percent of a polyhydric alcohol having a boiling point of about 200°-300° C. or greater.

The polyol of the present invention is a polyhydric alcohol composed of carbon, hydrogen and oxygen, optionally containing sulfur, but not containing nitrogen. The polyol has a normal boiling point of about 200°-300° C. or greater, preferably about 250°-300° C. or greater, and most preferably about 270° C. or greater. The polyol contains two or more hydroxyl groups. The polyol is preferably soluble in polypyrrolidone, but in any event it is soluble in a solvent which is also a solvent for polypyrrolidone, such solvents including formic acid and high temperature water. The melting point of the polyol will normally be below about 260° C. These polyhydric alcohols are also characterized by a surprisingly lower equivalent weight with respect to hydroxyl. Monohydric alcohols have a higher equivalent weight with respect to the hydroxyl function and are not as effective as the polyols. The molecular weight of the alcohol divided by the number of hydroxyl groups (OH) in the alcohol defines the equivalent weight of the alcohol with respect to the hydroxyl function. Octadecanol having a boiling point of 210° C. meets the boiling point requirement, but its one hydroxyl group provides an equivalent weight of about 130, which is too high to show sufficient thermal stabilization effect at reasonable alcohol concentrations in polypyrrolidone. Pentaerythritol, on the other hand, with its high boiling point and four hydroxyl groups, provides an equivalent weight of about 35 and is quite an effective thermal stabilizer at 2 weight percent of polyol. It is preferred that the polyols of the present invention have an equivalent weight with respect to hydroxyl function of about 100 or less, most preferably about 50 or less.

The preferred polyhydric alcohol is a polyhydric alkanol, including the polyhydric oxaalkanols and the polyhydric thiaalkanols which are both effective thermal stabilizers for polypyrrolidone. Such polyhydric alkanols include, for example, di-, tri-, and tetrahydric alkanols having 3 to 12 carbon atoms, such as the alpha, omega-glycols, pentaerythritol, and trimethylolethane. Polyhydric alkanols containing 4-6 carbon atoms are preferred, as are primary polyols. Lower alkyl substituted polyols are included, as are polyols containing other non-nitrogenous functional substituents, which substituents do not interfere with the process of this invention or the textile properties or quality of the polypyrrolidone composition and extruded product, while still providing thermal stabilization.

The melt extrusion of normally solid polypyrrolidone is improved by the inclusion of 5 weight percent or less of the polyhydric alcohol. Preferably, 3 weight percent or less of the polyhydric alcohol is used. Quantities as small as 0.1% are useful, but preferably at least 0.5% of the stabilizer is used. The melt extrusion is believed to be improved by the reduction in the rate of monomer formation at the melt temperature and the production of fibers of good tensile strength. The improvement is evident by the continuous extrusion of a filamentary poly-2-pyrrolidone composition at melt temperature in the range 260°-280° C., preferably 260°-275° C. and most preferably about 260°-270° C., without breaks, dripping, foam or bubbles, using ordinary commercial spinning equipment known to the synthetic textile art.

The "normally solid" poly-2-pyrrolidone of the present invention is polypyrrolidone having a weight average molecular weight in excess of about 5,000 and preferably in excess of about 50,000. The polyhydric alcohol is normally added to the solid polypyrrolidone by coating pellets of the polymer with the polyol before extrusion, or by pelletizing the polypyrrolidone resin with added polyol, but any convenient method may be used.

Thermal stabilization is determined, among other methods, by the measurement of weight loss by the polypyrrolidone polymer on a Mettler FP-1 hot stage at 269° C. over a period of five minutes, with and without the addition of the polyhydric alcohol. The monomer produced by this heat treatment is completely removed by extraction with water. The difference in weight between the starting polymer and the thermally-treated dry extracted polymer is the weight loss after correction for the amount of water-soluble additive. The polyhydric alcohol of the present invention produces an average decrease in weight loss of more than about 10% in this test, as shown in the following Table I. NMR analysis indicates that the polyol function is partially chemically incorporated into the polymer.

TABLE I

| Alcohol, Weight % | Mw × $10^{-3}$ | Reduction in Weight Loss by Monomer Formation[1] |
|---|---|---|
| none | 34 | — |
| $CH_3C(CH_2OH)_3$, 1.4 | 32 | 13% |
| $CH_3C(CH_2OH)_3$, 4.4 | 27 | 37% |
| $S(CH_2CH_2OH)_2$, 2.2 | 29 | 25% |
| $S(CH_2CH_2OH)_2$, 8.6 | 25 | 41% |
| $C(CH_2OH)_4$, 2.3 | 33 | 31% |
| Octadecylamine, 3.3 | 12 | −48% |

[1]Corrected for amount of water soluble additive.

Table I shows the effect of the addition of several polyhydric alcohols of the present invention. The molecular weight is given for the melt extruded polypyrrolidone having a starting molecular weight of about 350,000. The reduction in weight loss by monomer formation after five minutes at 269° C. is given as a percent improvement. In the case of octadecylamine a 48% increase in weight loss by monomer formation was found upon the addition of 3.3 weight percent of this material to the same polypyrrolidone. The compositions of the present invention provide a major reduction in monomer formation at high melt extrusion temperatures when used in small amounts in polypyrrolidone.

What is claimed is:

1. A composition of matter comprising a major amount of normally solid poly-2-pyrrolidone and 0.1–5 weight percent of a polyhydric alcohol having a boiling point of about 200°–300° C. or greater.

2. A composition according to claim 1 containing less than about 3 weight percent of said polyhydric alcohol.

3. A composition according to claim 1 wherein said polyhydric alcohol is a polyhydric alkanol.

4. A composition according to claim 1 wherein said polyhydric alcohol is a polyhydric alkanol having an equivalent weight with respect to the hydroxyl function of about 100 or less.

5. A composition according to claim 1 wherein said polyhydric alcohol is selected from the group consisting of trimethylolethane, pentaerythritol, and 1,5-dihydroxy-3-thiapentane.

6. A composition according to claim 1 wherein said polyhydric alcohol is a $C_3$–$C_{12}$ polyhydric alkanol.

7. A composition according to claim 1 wherein said polyhydric alcohol is a $C_4$–$C_6$ polyhydric alkanol.

8. A method of melt extruding normally solid poly-2-pyrrolidone which comprises admixing about 5 weight percent of a polyhydric alcohol having a boiling point of about 200°–300° C. or greater, and extruding said mixture at a melt temperature in the range of about 260°–280° C.

9. The method of claim 8 wherein said mixture is extruded at a melt temperature of about 260°–275° C.

10. The method of claim 8 wherein said mixture is extruded at melt temperature of about 260°–270° C.

11. A composition of matter according to claim 1 wherein said polyhydric alcohol has a boiling point of about 250°–300° C. or greater and is present in an amount of about 0.5–3 weight percent.

* * * * *